United States Patent [19]

Geiler et al.

[11] Patent Number: 4,782,945

[45] Date of Patent: Nov. 8, 1988

[54] RECLAIMABLE POLYESTER BOTTLE AND CARRIER ASSEMBLY

[76] Inventors: William A. Geiler; Eileen M. Geiler, both of Rte. 1, Box 100-H, Holly Ridge, N.C. 28445; Kristeen E. Geiler, 7411 Crowflock Ct., Matthews, N.C. 28105

[21] Appl. No.: 62,060

[22] Filed: Jun. 12, 1987

[51] Int. Cl.$^4$ .................. B65D 1/24; B65D 21/02; B65D 85/62

[52] U.S. Cl. ................... 206/203; 206/139; 206/427; 206/431; 206/509; 215/1 C; 215/12.1; 215/100 R; 220/23.83; 220/85 M; 220/DIG. 15

[58] Field of Search ............ 215/100 R, 100 A, 12.1, 215/DIG. 6, 1 C, 122, DIG. 3, 10; 220/85 H, 69, DIG. 15, 23.83, 468, 23.4, 67, 23.6; 206/139, 141, 203, 427, 431, 509; 150/52 R; 229/89, 5.6

[56] References Cited

U.S. PATENT DOCUMENTS

| | | | |
|---|---|---|---|
| 226,577 | 10/1882 | Babcock, Jr. | 206/431 X |
| 2,644,578 | 7/1953 | Bramming . | |
| 3,333,730 | 8/1967 | Zarlinski . | |
| 3,480,168 | 11/1969 | Lee | 215/1 C |
| 3,578,194 | 5/1971 | Cornelius | 215/12.2 |
| 3,842,976 | 10/1974 | Dea | 206/203 |
| 3,923,155 | 12/1975 | Tanzer | 206/141 |
| 3,940,001 | 2/1976 | Haefner | 215/12.2 X |
| 3,974,819 | 3/1976 | Melville | 220/DIG. 15 X |
| 4,143,764 | 3/1979 | Moss, III | 206/429 |
| 4,143,784 | 3/1979 | Frahm, et al. | 215/12 R |
| 4,165,812 | 8/1979 | Jennison | 215/10 |
| 4,174,779 | 11/1979 | Slone | 206/427 |
| 4,256,224 | 3/1981 | Hirota | 206/203 |
| 4,271,965 | 6/1981 | Brambley et al. | 220/23.4 |
| 4,331,246 | 5/1982 | Sörensen | 215/1 C |
| 4,344,530 | 8/1982 | deLarosiere | 206/427 X |
| 4,589,560 | 5/1986 | Harris, Jr. | 215/1 C |
| 4,685,565 | 8/1987 | Sparling | 206/427 |

FOREIGN PATENT DOCUMENTS 3504908  8/1986  Fed. Rep. of Germany ...... 206/141

*Primary Examiner*—William Price
*Assistant Examiner*—Sue A. Weaver
*Attorney, Agent, or Firm*—Bell, Seltzer, Park & Gibson

[57] ABSTRACT

A bottle and carrier assembly adapted to facilitate the recycling of polyester resin bottles is disclosed. The assembly comprises a reusable bottle carrier having a side wall and a bottom surface, and a recyclable polyester resin bottle. The bottle has an upper neck portion, an elongate body portion, and a rounded bottom portion which prevents the bottle from standing upright when placed on a level surface. The bottle is removably disposed within the bottle carrier in an upright configuration, with the side walls of the bottle carrier overlying a major part of the bottle elongate body portion. The side walls of the bottle carrier and the elongate body portion of the bottle have interengaging portions for maintaining the upright configuration of the bottle. The rounded bottom portion of the bottle serves to discourage the removal, by a consumer, of the recyclyable bottle from the reusable bottle carrier.

24 Claims, 2 Drawing Sheets

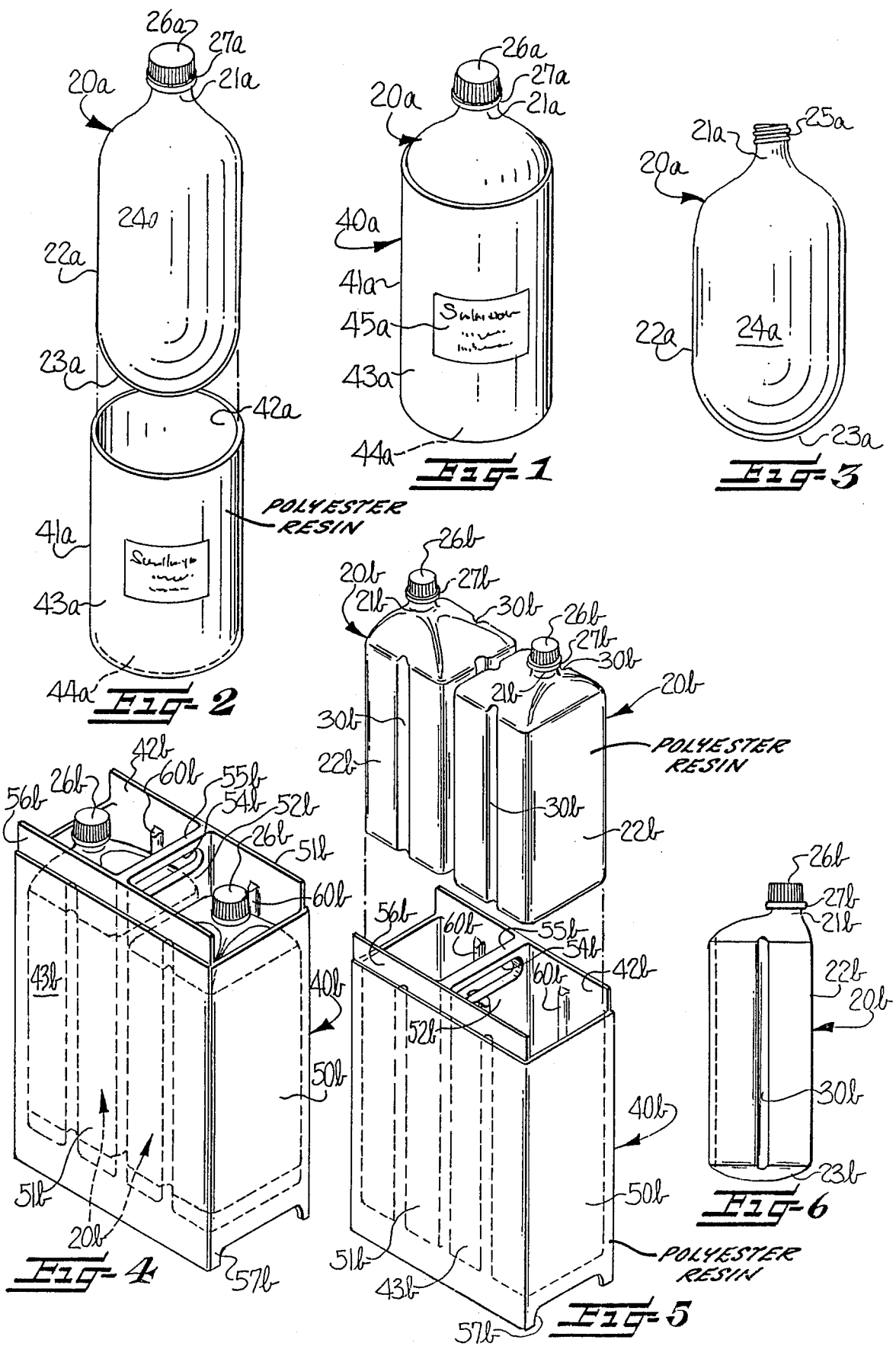

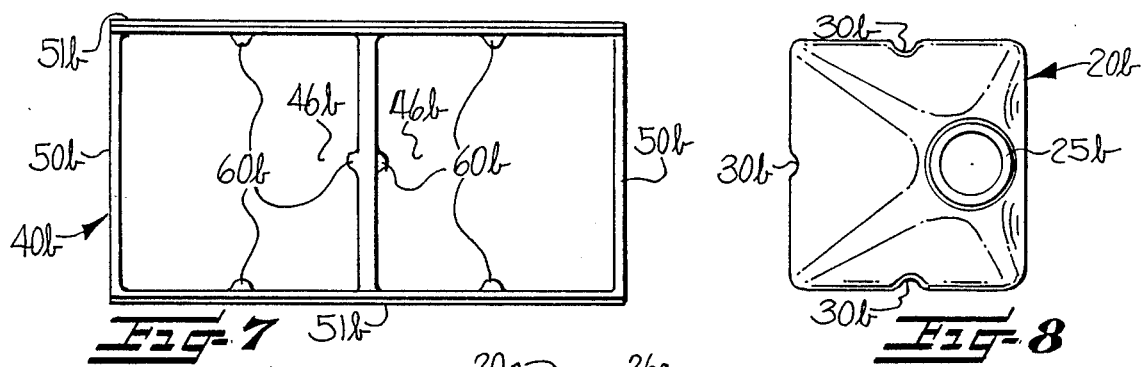
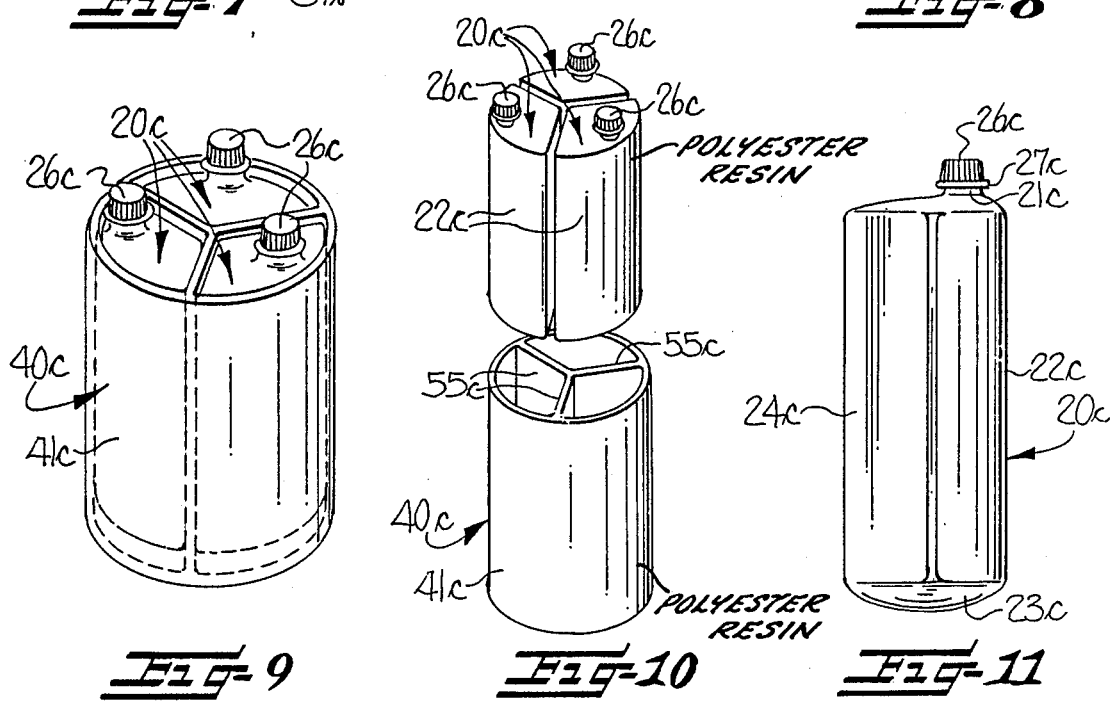
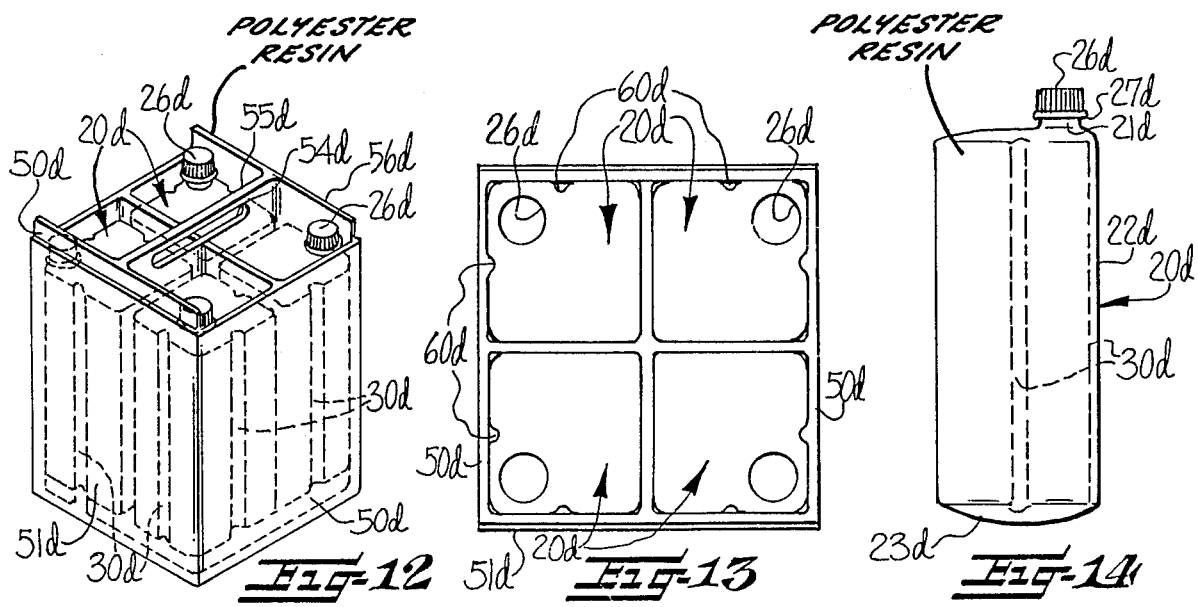

RECLAIMABLE POLYESTER BOTTLE AND CARRIER ASSEMBLY

BACKGROUND OF THE INVENTION

A need for liquid containers requiring less energy to construct than glass developed during past energy crises. Polyester plastic was selected to produce such containers because of its performance characteristics: leaching of gases through the container is minimal, and the toughness of polyester gives bottles formed from it superior protection against breakage. A whole new industry subsequently developed using polyester resin in place of glass for soft drink bottles and other containers. This industry has become substantial, with the market for polyester resins in 1987 estimated at nearly two billion pounds.

While the use of polyester bottles reduced energy requirements during manufacturing, problems with the disposal of empty bottles have developed. Disposal of these plastic containers has resulted in landfills having numerous small pockets of trapped air formed by the polyester bottles. This is brought about by the inherent ability of polyester bottles to return to their original form even after being compacted; the bottles are extremely difficult to crush or break. In an effort to reduce this problem, numerous states—including much of New England—have enacted deposit laws. Most of the remaining states are considering similar laws.

While deposit laws successfully reduce the number of plastic containers going into landfills, problems now confront bottlers who are required to take the used bottles back. Since federal law prohibits reusing polyester bottles as beverage containers, bottlers have been forced to find other means of disposing of these containers—hence the inception of a new industry for reclaiming bottles, processing them, and turning the reprocessed resin into a useful product. Many companies have been formed which wash and grind bottles to produce a product known as flake (named for its snowflake appearance).

Problems encountered in this reclamation process are caused by the need to separate the base cap (high density polyethylene), the paper and glue of the label, and the metal cap from the polyester bottle. Since current marketing practices require the production of both a green colored bottle for liquids containing sunlight sensitive ingredients and a clear bottle for other liquids, it has also become necessary to separate bottles by color during reclamation. In addition, processors are faced with limited marketing areas for the polyester resin they reclaim.

This final problem remains acute today. With only two accepted areas in which to market the reclaimed resin—fiber manufacturing and strapping—the market soon became glutted with resin, and a subsequent reduction in prices ensued. Most new companies formed solely for reclamation purposes went out of the market. The only companies which realized profits were those firms which used their reclaimed resin in products they themselves could market. The nature of the market being what it is, most firms decided to sit back and wait until new end use markets were developed.

Accordingly, an object of the present invention is to provide a recyclable bottle which need only be produced in a single color, so that the subsequent reclamation of the bottle is simplified. An additional object of the invention is to provide a recyclable bottle which requires neither the removal of a polyethylene base cap nor the removal of paper and glue therefrom. A still further important object of this invention is to provide a recyclable bottle which serves to create an inherent market for a portion of the reclaimed polyester resin.

SUMMARY OF THE INVENTION

The foregoing and other objects and advantages are achieved by the bottle and carrier assembly disclosed herein, which comprises a reusable bottle carrier having side wall means and a bottom surface, and a recyclable polyester resin bottle having an upper neck portion, an elongate body portion, and a rounded bottom portion which prevents the bottle from standing upright when placed on a level surface. The bottle is removably disposed within the bottle carrier in an upright configuration, with the side wall means of the bottle carrier overlying a major part of the bottle elongate body portion. The side wall means of the bottle carrier and the elongate body portion of the bottle have interengaging portions for maintaining the upright configuration of the bottle. Preferably the interengaging portions are configured to make removal of the bottle by a consumer more difficult, and to prevent the bottle from spinning in the carrier. The rounded bottom portion of the bottle also serves to discourage the removal by a consumer of the recyclable bottle from the reusable bottle carrier.

An alternate embodiment of the present invention comprises a reusable bottle carrier having side wall means and a bottom surface, and a plurality of recyclable polyester resin bottles. Each of the bottles again has an upper neck portion, an elongate body portion, and a rounded bottom portion which prevents the bottles from standing upright when placed on a level surface. Each of the bottles is removably disposed within the bottle carrier in an upright configuration with the side wall means of the bottle carrier overlying a major part of each of the bottles elongate body portion. The side wall means of the bottle carrier and the elongate body portion of each of the bottles have interengaging portions for maintaining the upright configuration of each of the bottles. The rounded bottom portion of each of the bottles again serves to discourage the removal by a consumer of the recyclable bottles from the reusable bottle carrier.

Various embodiments of the present invention are illustrated in the accompanying figures and following detailed description.

BRIEF DESCRIPTION OF THE DRAWINGS

FIG. 1 is a perspective view of a bottle and carrier assembly of the invention.

FIG. 2 is an exploded view of the bottle and carrier assembly shown in FIG. 1.

FIG. 3 is a side plan view of the bottle shown in FIG. 1 with its carrier removed, showing the rounded bottom on the bottle.

FIG. 4 is a perspective view of an alternate embodiment of the invention.

FIG. 5 is an exploded view of the bottle and carrier assembly shown in FIG. 4.

FIG. 6 is a side plan view of one of the bottles shown in FIG. 4 removed from its carrier, showing the rounded bottom on the bottle.

FIG. 7 is a top plan view of the carrier shown in FIG. 5, showing the ridges formed on the interior wall of the carrier for securing the bottles therein.

FIG. 8 is a top plan view of the bottle shown in FIG. 5, showing the longitudinal slots formed in the sides of the bottle.

FIGS. 9 and 10 are a perspective and exploded perspective view, respectively, of a third embodiment of the invention.

FIG. 11 is a side plan view of one of the bottles shown in FIG. 10 with the carrier removed, showing the rounded bottom on the bottle.

FIGS. 12 and 13 are a perspective and top plan view, respectively, of a fourth embodiment of the invention.

FIG. 14 is a side plan view of one of the bottles shown in FIG. 12 with its carrier removed, showing the rounded bottom on the bottle.

DETAILED DESCRIPTION OF THE INVENTION

A first embodiment of the invention is shown in FIGS. 1 through 3. This embodiment comprises a single bottle 20a and a bottle carrier 40a. In this embodiment the bottle carrier functions, in essence, as a jacket for the bottle. The bottle has an upper neck portion 21a, an elongate body portion 22a, and a rounded bottom portion 23a. The elongate body portion is generally cylindrical in shape, with a smooth side surface portion 24a. The neck portion is axially aligned with the body portion. The neck has threads 25a formed thereon so that it may receive a cap 26a. When the bottle is used as a beverage container, the cap is preferably provided with a frangible lip 27a as a seal.

The carrier is generally cylindrical in shape. The carrier has a side wall 41a with smooth inner and outer surface portions 42a, 43a. The carrier as a generally flat bottom surface 44a which may be in the form of either a planar lower surface entirely closing the bottom of the carrier, or a flat surface on the edges of the side walls of the carrier, with the bottom of the carrier open. In prior beverage containers, a base cap provided a stand which served to reinforce the bottle and maintain the bottle upright. The carrier performs both these functions, thereby eliminating the need for a base cap.

The bottle 20a is removably disposed in the carrier in an upright configuration. The side wall 41a of the carrier overlies a major part of the elongate body portion 22a of the bottle, and, as shown in FIG. 1, preferably overlies substantially all of the elongate body portion 22a. The outer surface portion 43a of the carrier advantageously provides a surface for carrying a label 45a or the like without the need for adhering the label to the recyclable bottle. The label may be any conventional label, such as a preprinted paper label or a direct printed label.

The construction of the bottle and carrier assembly is influenced by public health regulations, which generally prohibit beverage containers from being made of recycled polyester. Accordingly, the bottle 20a is preferably formed from virgin polyester so that it may be used as a beverage container. In addition, the bottle is preferably made of a clear polyester resin which may be easily recycled with like bottles without the need for sorting bottles to be recycled by color. The carrier 40a can be constructed from any suitable material, but is preferably made of a recycled polyester resin to reduce costs, and is preferably made from a pigmented resin to shield the contents of the bottle from light. If the bottle is not intended for use as a beverage container, it need not be made of virgin resin.

In the assembly shown in FIGS. 1 and 2, the side wall 24a of the bottle body portion 22a and the inner surface 42a of the bottle carrier side wall 41a frictionally interengage. These portions are configured so that the bottle 20a is firmly and resiliently secured when pressed into the bottle carrier 40a, yet the nature of the configuration is such that the bottle 20a is releasably secured within the carrier 40a. The purpose of the securement is to discourage removal of the bottle from the carrier by the consumer, and to prevent unintended separation of the bottle from the carrier when pouring a liquid from the bottle, while permitting mechanically assisted separation of the bottle and carrier at the recycling plant.

A second embodiment of the invention is shown in FIGS. 4 through 8. In this embodiment, a pair of bottles 20b are received in the carrier 40b. The bottles are again comprised of an upper neck portion 21b, an elongate body portion 22b threads 25b formed on the neck portion 21b, a cap 26b having a frangible lip 27b, and a rounded bottom portion 23b which prevents the bottle from standing upright when placed on a level surface. The body portion 22b is generally square in transverse cross-section, and the carrier 40b is generally rectangular in transverse cross-section. The neck portion 21b of the bottles is offset from the center axis of the body portion 22b and positioned adjacent the end side wall 50b of the case to facilitate the pouring of materials stored in the bottles.

The carrier has two pairs of side walls 50b, 51b with flat inner and outer surface portions 42b, 43b. An inner wall 52b bridges the two lateral side walls 51b to divide the carrier into two compartments, with each compartment configured to receive a single bottle. An elongate slot 54b is formed at the top of the inner wall 52b so that the inner wall 52b and the elongate slot 54b together provide a handle 55b extending upward from the carrier.

The lateral side walls of the carrier have recessed edge portions 56b formed along the top edges of the lateral side walls 51b. The bottom portion 57b of the carrier is configured to receive the handle 55b and the edge portions 56b of a like carrier, so that like carriers may be stacked in nesting relation with one another. The carrier may have means formed thereon to aid in the mechanical securement of the carrier during removal of the bottle. Said means preferably comprise at least one hole formed in the bottom of the carrier, such as the holes 46b formed in the bottom of the carrier (see FIG. 7). These holes advantageously permit moisture to escape therethrough.

The interengaging portions of the assembly in this embodiment include at least one longitudinal ridge formed on either the side wall of the bottle carrier or the elongate body portion of the bottle, and at least one mating longitudinal groove formed on the other of either the side wall of the bottle or the elongate body portion of the bottle. In the illustrated embodiment, as best shown in FIGS. 5 and 7, a plurality of elongate longitudinal ridges 60b are formed on the side wall of the bottle carrier 40b. As best shown in FIGS. 5 and 8, a plurality of mating, longitudinal grooves 30b are formed on the elongate body portion 22b of the bottle 20b. The positions of the grooves and ridges are configured so that the bottles 20b can fit into the carrier 40b in one position only, with each neck portion 21b adjacent respective end side walls 50b. These grooves and ridges are configured to frictionally engage each other and so as to provide the same firm and resilient yet releasable securement described in connection with the embodiment described above.

A third embodiment of the invention is shown in FIGS. 9 through 11. In this embodiment, the carrier 40c is configured to receive three bottles 20c, the carrier is generally cylindrical in shape, and the bottles are generally pie-shaped in transverse cross-section. The features of this embodiment which are similar to features in previously described embodiments have been assigned the same numbers with the "c" subscript. This embodiment includes three inner walls 55c which are joined together at their inner edge portions at the center axis of the carrier 40c, and are joined to the side wall 41c of the carrier at their respective outer edge portions, to divide the carrier into three separate compartments. If a less rigid carrier is acceptable, these inner walls can be eliminated, and the bottles made slightly larger in size, with side surface portions 24c of adjacent bottles interengaging one another.

A fourth embodiment of the invention is shown in FIGS. 12 through 14. This embodiment is a variation on the embodiment shown in FIGS. 4 through 8, with similar elements assigned the same numbers with the "d" subscript. From these four embodiments, those skilled in the art will appreciate that numerous other variations can be made in the size, shape, and configuration of applicants' invention while still capturing the essence of the invention.

Although specific terms have been employed to describe the invention in the specification above, they are used in a generic, descriptive sense only and not for purposes of limitation, the scope of the invention being set forth in the following claims. Equivalents of the claims are to be included therein.

That which is claimed is:

1. A bottle and carrier assembly adapted to facilitate the recycling of polyester resin bottles, comprising a reusable bottle carrier having side wall means and a bottom surface, and at least one recyclable polyester resin bottle having an upper neck portion, an elongate body portion, and a rounded bottom portion which prevents said bottle from standing upright when placed on a level surface, said one bottle being removably disposed within said bottle carrier in an upright configuration with said side wall means of said bottle carrier overlying a major part of said bottle elongate body portion, said side wall means of said bottle carrier and said elongate body portion of said one bottle having interengaging portions for maintaining said upright configuration of said bottle, and whereby said rounded bottom portion of said bottle serves to discourage the removal by a consumer of said recyclable bottle from said reusable bottle carrier.

2. A bottle and carrier assembly as claimed in claim 1, wherein said side wall means of said bottle carrier overlie substantially all of said bottle elongate body portion, and wherein said side wall means include an exterior surface for carrying labels and the like without the need for adhering labels to said recyclable bottle.

3. A bottle and carrier assembly as claimed in claim 1, wherein said polyester resin bottle is formed of a clear, virgin, polyester resin and said bottle carrier is formed of a pigmented, recycled, polyester resin which serves to shield the contents of said bottle from light.

4. A bottle and carrier assembly as claimed in claim 1, wherein said elongate body portion of said bottle is a cylindrical body portion, and said neck portion is axially aligned with said body portion.

5. A bottle and carrier assembly as claimed in claim 1, wherein said carrier has a handle formed thereon and extending upwardly therefrom, and said bottom portion of said carrier is configured to receive the handle of a like carrier so that like carriers may be stacked in nesting relation with one another.

6. A bottle and carrier assembly as claimed in claim 1, wherein said interengaging portions of said bottle carrier and said elongate body portion of said bottle are configured to frictionally engage each other and so as to releasably secure said bottle within said bottle carrier and thereby serve to discourage the removal by a consumer of said recyclable bottle from said reusable bottle carrier.

7. A bottle and carrier assembly as claimed in claim 6, wherein said interengaging portions comprise at least one longitudinal ridge formed on either said side wall means of said bottle carrier or said elongate body portion of said bottle, and at least one mating longitudinal groove formed on the other of either said side wall of said bottle carrier or said elongate body portion of said bottle, and with the associated ridges and grooves frictionally engaging each other.

8. A bottle and carrier assembly as claimed in claim 7, wherein said carrier has at least one hole formed in the bottom surface of said carrier to aid in the mechanical securement of the carrier during removal of the bottle.

9. A bottle and carrier assembly as claimed in claim 1, wherein said carrier is configured to receive a single bottle, said carrier is generally cylindrical in shape, said body portion of said bottle is generally cylindrical in shape, and said neck portion of said bottle is axially aligned with said body portion of said bottle.

10. A bottle and carrier assembly adapted to facilitate the recycling of polyester resin bottles, comprising a reusable bottle carrier formed of a pigmented, recycled, polyester resin and having side wall means and a bottom surface, and at least one recyclable bottle formed of clear, virgin polyester resin and having an upper neck portion, an elongate body portion, and a rounded bottom portion which prevents said bottle from standing upright when placed on a level surface, said one bottle being removably disposed within said bottle carrier in an upright configuration with said side wall means of said bottle carrier overlying substantially all of said bottle elongate body portion to shield the contents of said bottle from light, said side wall means including an exterior surface for carrying labels and the like without the need for adhering labels to said recyclable bottle, said side wall means of said bottle carrier and said elongate body portion of said bottle having interengaging portions for maintaining said upright configuration of said bottle with said interengaging portions configured to frictionally engage each other and so as to releasably secure said bottle within said bottle carrier, whereby said interengaging portions and said rounded bottom portion of said bottle together serve to discourage the removal by a consumer of said recyclable bottle from said reusable bottle carrier.

11. A bottle and carrier assembly as claimed in claim 10, wherein said carrier is configured to receive a single bottle, said carrier is generally cylindrical in shape, said body portion of said bottle is generally cylindrical in shape, and said neck portion of said bottle is axially aligned with said body portion of said bottle.

12. A bottle and carrier assembly as claimed in claim 10, wherein said carrier has a handle formed thereon and extending upwardly therefrom, and said bottom portion of said carrier is configured to receive the handle of a like carrier so that like carriers may be stacked in nesting relation with one another.

13. A bottle and carrier assembly as claimed in claim 10, wherein said interengaging portions comprise at least one longitudinal ridge formed on either said side wall means of said bottle carrier or said elongate body portion of said bottle, nd at least one mating longitudinal groove formed on the other of either said side wall means of said bottle carrier or said elongate body portion of said bottle.

14. A bottle and carrier assembly as claimed in claim 10, wherein said carrier has at least one hole formed in the bottom surface thereof to aid in the mechanical securement of the carrier during removal of the bottle.

15. A bottle and carrier assembly adapted to facilitate the recycling of polyester resin bottles, comprising a reusable bottle carrier having side wall means and a bottom surface, and a plurality of recyclable polyester resin bottles, each of said bottles having an upper neck portion, an elongate body portion, and a rounded bottom portion which prevents said bottles from standing upright when placed on a level surface, each of said bottles being removably disposed within said bottle carrier in an upright configuration with said side wall means of said bottle carrier overlying a major part of each of said bottle elongate body portions, said side wall means of said bottle carrier and said elongate body portions of each of said bottles having interengaging portions for maintaining said upright configuration of each of said bottles, and whereby said rounded bottom portion of each of said bottles serves to discourage the removal by a consumer of said recyclable bottles from said reusable bottle carrier.

16. A bottle and carrier assembly as claimed in claim 15, wherein said carrier is configured to receive a pair of bottles, wherein said body portion of each of said bottles is generally square in transverse cross-section, and wherein said carrier is generally rectangular in transverse cross-section.

17. A bottle and carrier assembly as claimed in claim 15, wherein said neck portion of each of said bottles is offset from the center axis of said body portion of each of said bottles and positioned adjacent said side wall means of said carrier to facilitate the pouring of materials stored in said bottles.

18. A bottle and carrier assembly as claimed in claim 15, wherein said carrier is configured to receive three of said bottles, wherein said carrier is generally cylindrical in shape, and wherein each of said bottles is generally pie-shaped in transverse cross section.

19. A bottle and carrier assembly as claimed in claim 15, wherein said side wall means of said bottle carrier overlie substantially all of said elongate body portion of each of said bottles, and wherein said side wall means include an exterior surface for carrying labels and the like without the need for adhering labels to said recyclable bottles.

20. A bottle and carrier assembly as claimed in claim 15, wherein each of said polyester resin bottles is formed of a clear, virgin, polyester resin and said bottle carrier is formed of a pigmented, recycled, polyester resin which serves to shield the contents of said bottles from light.

21. A bottle and carrier assembly as claimed in claim 15, wherein said carrier has a handle formed thereon and extending upwardly therefrom, and said bottom portion of said carrier is configured to receive the handle of a like carrier so that like carriers may be stacked in nesting relation with one another.

22. A bottle and carrier assembly as claimed in claim 15, wherein said interengaging portions of said bottle carrier and said elongate body portion of each of said bottles are configured to frictionally engage each other and so as to releasably secure each of said bottles within said bottle carrier and thereby serve to discourage the removal by a consumer of said recyclable bottle from said reusable bottle carrier.

23. A bottle and carrier assembly as claimed in claim 22, wherein said interengaging portions comprise a plurality of longitudinal ridges formed on said side wall means of said bottle carrier and at least one mating longitudinal groove formed on the elongate body portion of each of said bottles.

24. A bottle and carrier assembly as claimed in claim 23, wherein said carrier has at least one hole formed in the bottom surface thereof to aid in the mechanical securement of the carrier during removal of the bottle.

* * * * *